United States Patent [19]

Gagneux et al.

[11] 3,862,171

[45] Jan. 21, 1975

[54] 6-PHENYL-4H-S-TRIAZOLO(1,5-A)(1,4)BENZODIAZEPINE-2-CARBOXYLIC ACIDS AND THEIR ESTERS

[75] Inventors: André Gagneux, Basel; Roland Heckendorn, Arlesh Eim Basel-Land; René Meier, Buus, Basel-Land, all of Switzerland

[73] Assignee: Ciba-Geigy Corporation, Ardsley, N.Y.

[22] Filed: Mar. 30, 1972

[21] Appl. No.: 239,779

[30] Foreign Application Priority Data
Apr. 8, 1971 Switzerland.................... 5232/71

[52] U.S. Cl............. 260/308 R, 260/141, 260/193, 260/247.2 R, 260/293.59, 260/326 N, 260/326.43, 260/570 AB, 424/269
[51] Int. Cl............................................. C07d 57/02
[58] Field of Search............................... 260/308 R

[56] References Cited
UNITED STATES PATENTS
3,703,525  11/1972  Tawada et al................... 260/308 R Primary Examiner—Alton D. Rollins
Attorney, Agent, or Firm—Joseph G. Kolodny; Theodore O. Groeger; John J. Maitner

[57] ABSTRACT

Compounds of the class of 6-phenyl-4H-s-triazolo[1,5-a]-[1,4]benzodiazepine-2-carboxylic acids, their salts with bases and their lower alkyl esters are valuable intermediates for the production of pharmaceutically active compounds and are accessible by a new reaction sequence starting from o-aminobenzophenones. Specific embodiments are the 6-phenyl-8-chloro-4H-s-triazolo[1,5-a][1,4]benzodiazepine-2-carboxylic acid and the 6-(o-chlorophenyl)-8-chloro-4H-s-triazolo-[1,5-a][1,4]benzodiazepine-2-carboxylic acid and their ethyl esters. By decarboxylation of the free acids, 6-phenyl-4H-s-triazolo[1,5-a][1,4]benzodiazepines without substituent in the 2-position are obtained which in particular possess anticonvulsant effectiveness.

19 Claims, No Drawings

6-PHENYL-4H-S-TRIAZOLO(1,5-A)(1,4)BENZODIAZEPINE-2-CARBOXYLIC ACIDS AND THEIR ESTERS

DETAILED DESCRIPTION

The present invention relates to new 6-phenyl-4H-s-triazolo[1,5-a][1,4]benzodiazepine-2-carboxylic acids and their esters, as well as to processes for their production.

The new 6-phenyl-4H-s-triazolo[1,5-a][1,4]benzodiazepine-2-carboxylic acids according to the invention and their esters correspond to the general formula:

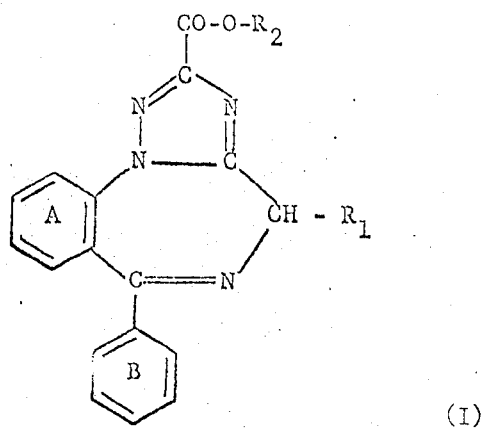

wherein $R_1$ represents hydrogen or a lower alkyl group.

$R_2$ represents hydrogen or a lower alkyl group. and wherein each of the rings A and B, independently of the other, is unsubstituted or substituted by one or more fluorine, chlorine and/or bromine atoms, alkyl or alkoxy groups each having 1 to 6 carbon atoms, trifluoromethyl groups and/or nitro groups; the invention relates likewise to the salts of the carboxylic acids embraced by the general formula I with inorganic and organic bases.

As a lower alkyl group in the compounds of the general formula I, $R_1$ preferably contains 1 to 3 carbon atoms, and is, e.g. the ethyl, propyl, and especially the methyl group. As a lower alkyl group, $R_2$ is, in particular, the methyl or ethyl group; it can however also be, e.g. a propyl or butyl group.

As substituents of the rings A and B, halogen atoms are fluorine, chlorine or bromine atoms; whilst suitable alkyl groups or alkoxy groups having 1 to 6 carbon atoms are, e.g. methyl, ethyl, propyl, isopropyl, butyl, isobutyl, tert.butyl, pentyl, isopentyl, 2,2-dimethylpropyl, hexyl or isohexyl groups, or methoxy, ethoxy, propoxy, isopropoxy, butoxy, isobutoxy, pentyloxy, isopentyloxy, 2,2-dimethylpropoxy, hexyloxy or isohexyloxy groups. A substituent of ring A is, in particular, in the 8-position, and is preferably fluorine, bromine, the nitro group, the trifluoromethyl group and, in particular, chlorine. Ring B is preferably unsubstituted, or substituted by fluorine, chlorine or bromine, or by the nitro or trifluoromethyl group, in any desired position, especially, however, by fluorine or chlorine in the o-position.

The compounds of the general formula I are valuable intermediates for the preparation of pharmacologically active substances. For example, it is possible to produce by decarboxylation of the carboxylic acids embraced by the general formula I — which are easily obtainable by hydrolysation of the lower alkyl esters embraced by the same general formula — the corresponding 6-phenyl-4H-s-triazolo[1,5-a][1,4]benzodiazepines, which are optionally substituted in ring A and/or in ring B, as well as, optionally, in 4-position. Decarboxylation can be performed, e.g. by the heating of the solution of a carboxylic acid embraced by the general formula I in diethylene glycol, to which solution has been added a little copper powder, to temperatures of between ca. 120° and 150°C, until the evolution of the carbon dioxide is complete. The thus obtained decarboxylation products, such as, e.g. 6-phenyl-8-chloro-4H-s-triazolo[1,5][1,4]benzodiazepine and 6-(o-chlorophenyl)-8-chloro-4H-s-triazolo[1,5-a][1,4] benzodiazepine, possess valuable pharmacological properties. They have an anticonvulsive and central-depressant action and inhibit somatic reflexes. The anticonvulsive effectiveness can be shown, e.g. in the pentetrazole-convulsion test on the mouse after oral administration. The mentioned properties and other properties, which can be determined by selected standard tests [cp. W. Theobald and H. A. Kunz, Arzneimittelforsch. 13, 122 (1963), and E. Theobald et al., Arzneimittelforsch. 17, 561 (1967)] characterise the decarboxylation products of carboxylic acids embraced by the general formula I as active substances for tranquillisers and anticonvulsants which are applicable, for example, for the treatment of states of tension and agitation, as well as for the treatment of epilepsy. The said active substances can be administered, in particular, orally or rectally in the form of the usual dosage units, such as tablets, dragees, capsules or suppositories. The dosage amount depends on the mode of administration, on the species, on the age, and on the individual condition. The daily doses vary between 0.15 mg/kg and 15 mg/kg for warm-blooded animals.

The compounds of the general formula I, and the salts of the carboxylic acids embraced by this general formula, are produced according to the invention in a technically advantageous reaction sequence by the conversion of an o-aminobenzophenone of the general formula II:

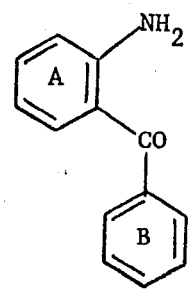

wherein the rings A and B can be substituted as defined under formula I, in a manner known per se, into a diazonium salt, especially the diazonium chloride; the coupling of the diazonium salt with a substituted malonic acid dialkyl ester of the general formula III:

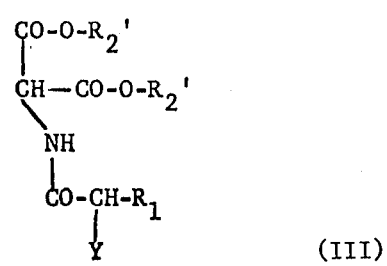

wherein

Y represents a halogen atom, or a nitrogen-containing group convertible by solvolysis into the amino group, and $R_2'$ represents a lower alkyl group, and $R_1$ has the meaning given under formula I, to obtain a compound of the general formula IV:

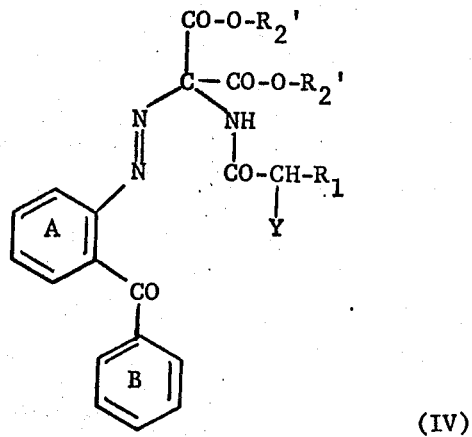

(IV)

wherein $R_1$, $R_2'$ and Y have the meanings given under formula I and under formula III, and the rings A and B can be substituted as defined under formula I; the reaction of a basic medium with the compound of the general formula IV, and the reaction then of an obtained compound of the general formula V:

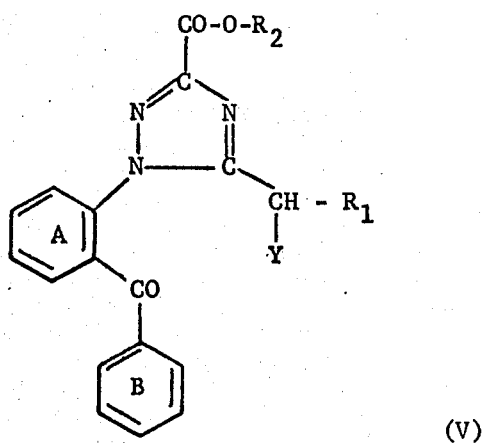

(V)

wherein

Y represents a halogen atom, $R_1$ and $R_2$ have the meanings given under formula I, and the rings A and B can be substituted as defined there, optionally after a preliminary treatment with an alkali metal iodide, with ammonia or hexamethylenetetramine; or the reaction of the said compound with an alkali metal azide and the reduction of the obtained azido compound; or the reaction of the said compound with an alkali metal compound of an amide or of a dicarboxylic acid imide, particularly phthalimide and the subjecting of the compound of the general formula V obtained in this manner, or obtained direct with the above-mentioned reaction with a basic medium, in which formula V Y represents a nitrogen-containing radical convertible by solvolysis into the amino group, $R_1$ and $R_2$ have the meanings given under formula I, and the rings A and B can be substituted as defined there, to a corresponding solvolysis.

The diazotisation of the compounds of the general formula II is performed, e.g. by means of aqueous sodium nitrite solution in a mixture of hydrochloric acid and acetic acid, e.g. a mixture of conc. hydrochloric acid and glacial acetic acid in the ratio of 4:1, at room temperature. This starting material of the general formula III is combined, e.g. as a solution in acetone or ethanol, optionally buffered with potassium acetate, at temperatures of 0° to 50°C with the diazonium salt solution; the reaction mixture is rendered slightly alkaline preferably by the gradual addition of aqueous potassium carbonate or sodium carbonate solution at 5° to 20°C, and the obtained compound of the general formula IV separated in the usual manner, and preferably further processed as crude product.

The ring closure of compounds of the general formula IV to triazole derivatives of the general formula V with simultaneous elimination of an alkoxycarbonyl group in a basic medium is performed, e.g. by means of a diluted aqueous or aqueous-organic alkali hydroxide solution, especially sodium hydroxide or potassium hydroxide solution, at room temperature, or at moderately elevated temperatures up to the boiling temperature of the reaction medium. The organic solvent employed is, e.g. dioxane, or a lower alkanol such as ethanol. If mild reaction conditions are chosen, e.g. reaction at room temperature of, at most, the double molecular amount of alkali hydroxide, relative to the amount of the compound of formula IV, and neutralisation of the reaction mixture before processing, then the principal product obtained is a compound of the general formula V in which $R_2$ represents a lower alkyl group; whereas under less mild conditions the corresponding carboxylic acid is obtained with a hydrogen atom as $R_2$. Ring closure can also be performed by means of an aqueous-organic ammonia solution, e.g. in a mixture of conc. aqueous ammonia and dimethylformamide. With the use of starting materials of the general formula IV wherein Y is a halogen atom, it is possible to obtain, under mild conditions and with low ammonia concentrations, the corresponding compounds of the general formula V having a lower alkyl group as $R_2$; advantageously, however, the reaction conditions are so arranged that the halogen atom Y reacts in situ with the ammonia, and the second ring closure to the corresponding compound of the general formula I wherein $R_2$ represents a lower alkyl group then occurs.

The reaction of compounds of the general formula V wherein Y represents a halogen atom with ammonia or with hexamethylenetetramine is performed at room temperature or at moderately elevated temperatures, e.g. preferably from 20° to 100°C, or up to the boiling point of the reaction mixture, if this is lower, the reaction with ammonia being preferably carried out in the lower half of the stated temperature range, and the reaction with hexamethylenetetramine preferably in the upper half. Mild reaction conditions are to be applied particularly in the case of the reaction of intermediates of the general formula V wherein $R_2$ is a lower alkyl group. The ammonia can be used as such, or in the form of the concentrated aqueous solution; and the inert organic solvent employed can be, e.g. dioxane, tetrahydrofuran, ethanol, butanol or, with the use of dry ammonia, e.g. also benzene or toluene. If the halogen atom of the intermediate of the general formula V is a chlorine atom, then it can be of advantage, immediately before the reaction with ammonia or hexamethylenetetramine, to replace the chlorine atom with an iodine atom by reaction of the compound concerned of the general formula V with potassium or sodium iodide.

The reaction, optionally occurring in place of the direct ring closure, of an intermediate of the general formula V containing a halogen atom as radical Y with an alkali metal azide, especially sodium azide, is preferably likewise performed after pretreatment with sodium or potassium iodide in an inert organic solvent, such as, e.g. dimethylsulphoxide, at room temperature or at slightly elevated temperatures, preferably between ca. 20° and 40°C.

For the reduction and simultaneous cyclisation of azido compounds obtained from compounds of the general formula V, it is possible to use, e.g. triphenylphosphine. The reaction of this occurs preferably at room temperature or at moderately elevated temperature, i.e. between ca. 20° and 100°C, in an inert organic solvent, such as, e.g. tetrahydrofuran, dioxane or benzene. With the evolution of nitrogen, there is initially formed from the azido group an N-(triphenylphosphoranylidene)-amino group, which immediately reacts with the keto group with ring closure and formation of the corresponding compound of the general formula I. Triphenylphosphine oxide is thereby liberated; hence, the overall reaction can be considered as a reduction. A further suitable reducing agent is tin(II)-chloride, which is employed, e.g. in lower alkanolic-aqueous, especially ethanolic-aqueous, alkali hydroxide solution, e.g. sodium hydroxide solution, at temperatures of between 0° and the boiling temperature. A further suitable procedure is the action of hydrogen in the presence of a hydrogenation catalyst, e.g. palladium charcoal catalysts, platinum oxide or Raney nickel, in an organic solvent, such as dioxane, ethanol, methanol or tetrahydrofuran, under normal pressure and at moderately elevated temperature.

In the starting materials of the general formula III and in the intermediates of the general formulae IV and V, suitable groups as radicals Y which can be converted by solvolysis into the amino group are, in particular, the phthalimido group, and also phthalimido groups containing inert substituents in the benzene nucleus, as well as the succinimido group. If such groups, especially the phthalimido group, are not already present as radical Y in the compound of the general formula V, they are introduced into corresponding compound having a nitrogen atom Y by reaction of the said compounds with alkali metal derivatives of amides or imides, such as, for example, phthalimide potassium or succinimide sodium, in suitable inert organic solvents, such as, e.g. dimethylformamide, at room temperature, or at moderately elevated temperatures up to ca. 80°C.

The solvolysis and simultaneous cyclisation of compounds of the general formula V wherein Y is an optionally substituted phthalimido group can be performed particularly with hydrazine, which is employed, e.g. as hydrate, in a lower alkanol, such as methanol or ethanol to which has preferably been added, to improve the dissolving capacity, a halogenated hydrocarbon such as chloroform, at room temperature up to the boiling temperature of the reaction mixture, preferably between ca. 20° and 60°C. The solvolysis and cyclisation of compounds of the general formula V having a succinimido group Y can likewise by performed by means of hydrazine, but also by means of an alkanolic-aqueous alkali hydroxide solution at elevated temperature.

Of the starting materials of the general formula II, an appreciable number have been described in the literature, e.g. 2-amino-5-chlorobenzophenone [cf. F. D. Chattaway, J.Chem.Soc. 85, 344 (1904)], 2-amino-2',5'-dichloroacetophenone [cf. L. H. Sternbach et al., J.Org.Chem. 26, 4488 (1961)], as well as 2-amino-5-chloro-2'-fluorobenzophenone, and others [cf. L. H. Sternbach et al., J.Org.Chem. 27, 3781-3788 (1962)].

Starting materials of the general formula III having a halogen atom, especially a chlorine atom, as radical Y are obtained, e.g. by the method described by Ajay Kumar Bose, J.Indian Chem.Soc. 31, 108-110 (1954) for the production of the (2-chloroacetamido)-malonic acid diethyl ester, by the refluxing for several hours of the hydrochloride of a lower aminomalonic acid dialkyl ester and a 2-halogenoalkanoic acid, particularly 2-chloroalkanoic acid, having 2 to 5 carbon atoms with phosphorus trichloride in 1,2-dichloroethane, and the separation of the reaction product in the usual manner. Starting materials of the general formula III having a nitrogen-containing radical Y convertible by solvolysis into the amino group, such as, e.g. the phthalimido group, are obtained, e.g. by reaction of the corresponding compounds containing a chlorine atom as Y with alkali metal derivatives of suitable nitrogen compounds, especially of imides, such as, e.g. phthalimide potassium. It is also possible, however, to react, according to the method mentioned by A. K. Bose, loc.cit., 2-phthalimidoalkanoic acids, such as, e.g. 2-phthalimidoacetic acid, with lower aminomalonic acid dialkyl ester hydrochlorides, with the use of phosphorus trichloride as condensation agent, in boiling 1,2-dichloroethane.

If the lower alkyl esters embraced by the general formula I are obtained as final materials of the reaction sequence, these can optionally be converted, in the usual manner, e.g. by boiling in highly diluted, lower-alkanolic-aqueous alkali hydroxide solution, into the corresponding solutions of alkali salts of the carboxylic acids embraced by the general formula I, and liberation form these solutions, after removal of the lower alkanol by evaporation, of the carboxylic acid by acidification. The alkali salts and other salts of carboxylic acids embraced by the general formula I can be obtained from the carboxylic acids in the usual manner, e.g. by neutralisation of organic solutions of the said carboxylic acids with inorganic bases, or addition of equivalent amounts of organic bases, and subsequent concentration by evaporation. The following may be mentioned as examples of salts: sodium, potassium, lithium, magnesium, calcium and ammonium salts, as well as salts with ethylamine, isopropylamine, triethylamine, 2-aminoethanol, 2,2'-imino-diethanol, 2-(dimethylamino)-ethanol, 2-(diethylamino)-ethanol, ethylenediamine, pyrrolidine, piperidine, morpholine and 1-piperidineethanol.

The carboxylic acids embraced by the general formula I can not only be used for the previously mentioned decarboxylation, but can also be used as starting materials for the synthesis of further pharmacologically valuable compounds. The same applies with regard to the lower alkyl esters, as well as to the salts, particularly the alkali salts, of the mentioned carboxylic acids.

The following examples further illustrate the production of the compounds of the general formula I and of intermediates not hitherto described, as well as the mentioned decarboxylation. The examples are, however, in no way to limit the scope of the invention. The temperatures are expressed in degrees Centigrade. Silica gel Merck (registered trade-mark), particle-size 0.05–0.2 mm, is used for elution chromatography.

EXAMPLE 1 a. A solution of 58.0 g (0.25 moles) of 2-amino-5-chlorobenzophenone [cp. F. D. Chattaway, J.Chem.-Soc. 85, 344 (1904)] in 310 ml of glacial acetic acid/-concentrated hydrochloric acid (4:1) is diazotised at room temperature, whilst the solution is stirred, with 50 ml (0.25 moles) of aqueous sodium nitrite solution. An addition is made to the obtained diazonium salt solution of 150 g of ice followed by the rapid addition dropwise of a solution of 52.4 g (0.208 moles) of (2-chloroacetamido)-malonic acid diethyl ester [cp. Ajay Kumar Bose, J. Indian Chem.Soc. 31, 108–110 (1954)] in 600 ml of acetone. A solution of 276.0 g (2 moles) of potassium carbonate in 500 ml of water is subsequently added dropwise at 5°–10° in the course of 20 minutes; stirring is continued for a further hour, and benzene and saturated sodium chloride solution are then added. The benzene solution is separated, washed with saturated sodium chloride solution, dried over sodium sulphate, and concentrated by evaporation. In this way are obtained 121 g of crude(2-chloroacetamido)-(2-benzoyl-4-chlorophenylazo)-malonic acid diethyl ester.

b. The crude diethylester obtained according to a is dissolved in 1.5 litres of dioxane. To the obtained dioxane solution are added 36 g (0.9 moles) of sodium hydroxide dissolved in 2 litres of water; the mixture is stirred for 30 minutes and the dioxane then evaporated off in vacuo. The residue is diluted with 500 ml of water, and 20 g of active charcoal are added; the mixture is then well stirred and filtered through purified diatomaceous earth. To the filtrate is added, with thorough stirring, 2-N hydrochloric acid until an acid reaction to a congo-red indicator is obtained; the precipitated carboxylic acid is filtered off under suction, washed with water, and recrystallised from hot methanol. The obtained 1-(2-benzoyl-4-chlorophenyl)-5-(chloromethyl)-1H-1,2,4-triazole-3-carboxylic acid sinters at 137°–138°, and melts with decomposition at 169°–171°. The crystals contain an equimolar amount of methanol.

Analogously to a and b are obtained with the use of 66.5 g (0.25 moles) of 2-amino-2',5-dichlorobenzophenone: 1-[2-(o-chlorobenzoyl)-4-chlorophenyl]-5-(chloromethyl)-1H-1,2,4-triazole-3-carboxylic acid, M.P.170°–175°(decomposition; substance precipitated with 2-n.hydrochloric acid from solution in aqueous ammonia);
with the use of 62.5 g (0.25 moles) of 2-amino-5-chloro-2'-fluorobenzophenone: 1-[2-(o-fluorobenzoyl)-4-chlorophenyl]-5-(chloromethyl)-1H-1,2,4-triazole-3-carboxylic acid, (solidified foam); with the use of 75.0 g (0.25 moles) of 2-amino-5-chloro-2'-(trifluoromethyl)-benzophenone: 1-[2-($\alpha,\alpha,\alpha$-trifluoro-o-tolyl)-4-chlorophenyl]-5-(chloromethyl)-1H-1,2,4-triazole-3-carboxylic acid;
with the use of 53.8 g (0.25 moles) of 2-amino-5-fluorobenzophenone: 1-(2-benzoyl-4-fluorophenyl)-5-(chloromethyl)-1H-1,2,4-triazole-3-carboxylic acid;
with the use of 69.0 g (0.25 moles) of 2-amino-5-bromobenzophenone: 1-(2-benzoyl-4-bromophenyl)-5-(chloromethyl)-1H-1,2,4-triazole-3-carboxylic acid;
with the use of 66.2 g (0.25 moles) of 2-amino-5-(trifluoromethyl)-benzophenone: 1-(2-benzoyl-$\alpha,\alpha,\alpha$-trifluoro-p-tolyl)-5(chloromethyl)-1H-1,2,4-triazole-3-carboxylic acid;
with the use of 60.8 g (0.25 moles) of 2-amino-5-nitrobenzophenone: 1-(2-benzoyl-4-nitrophenyl)-5-(chloromethyl)-1H-1,2,4-triazole-3-carboxylic acid.

c. An amount of 33.2 g (0.20 moles) of potassium iodide is dissolved in 85 ml of water. The obtained solution is diluted with 850 ml of dioxane, and an addition then made at 25°, with stirring, of 71.5 g (0.175 moles) of the 1-(2-benzoyl-4-chlorophenyl)-5-(chloromethyl)-1H-1,2,4-triazole-3-carboxylic acid produced according to b containing an equimolar amount of methanol. The reaction solution is heated for 1 hour at 45°–50° and 0.5 litres of aqueous ammonia are then added; the mixture is heated for 2 hours at 45°–50° and afterwards concentrated in vacuo. The residue is dissolved in 2 litres of water, and 2-N hydrochloric acid added until an acid reaction to a congo-red indicator is shown. The free carboxylic acid precipitates; it is then filtered off under suction, washed until neutral with water, subsequently washed with methanol, and dried at 120°–130° in vacuo. The obtained 6-phenyl-8-chloro-4H-s-triazolo[1,5-a] [1,4]benzodiazepine-2-carboxylic acid decomposes at 170°.

The following are obtained in an analogous manner: from 72.0 g (0.175 moles) of 1-[2-(o-chlorobenzoyl)-4-chlorophenyl]-5-(chloromethyl)-1H-1,2,4-triazole-3-carboxylic acid: 6-(o-chlorophenyl)-8-chloro-4H-s-triazolo[1,5-a][1,4]benzodiazepine-2-carboxylic acid, M.P. 190°–195° (decomposition, from methanol); from 69.0 g (0.175 moles) of 1-[2-(o-fluorobenzoyl)-4-chlorophenyl]-5-(chloromethyl)-1H-1,2,4-triazole-3-carboxylic acid: 6-(o-fluorophenyl)-8-chloro-4H-s-triazolo[1,5-a][1,4]benzodiazepine-2-carboxylic acid; M.P. 179°–182° (decomposition, from methanol); from 77.6 g (0.175 moles) of 1-[2-($\alpha,\alpha,\alpha$-trifluoro-o-tolyl)-4-chlorophenyl]-5-(chloromethyl)-1H-1,2,4-triazole-3-carboxylic acid: 6-($\alpha,\alpha,\alpha$-trifluoro-o-tolyl)-8-chloro-4H-s-triazolo[1,5-a][1,4[benzodiazepine-2-carboxylic acid; from 63.0 g (0.175 moles) of 1-(2-benzoyl-4-fluorophenyl)-5-(chloromethyl)-1H-1,2,4-triazole-3-carboxylic acid:6 -phenyl-8-fluoro-4H-s-triazolo[1,5-a][1,4]benzodiazepine-2-carboxylic acid;
from 73.7 g (0.175 moles) of 1-(2-benzoyl-4-bromophenyl)-5-(chloromethyl)-1H-1,2,4-triazole-3-carboxylic acid:6-phenyl-8-bromo-4H-s-triazolo[1,5-a][1,4]benzodiazepine-2-carboxylic acid;
from 71.8 g (0.175 moles) of 1-(2-benzoyl-$\alpha,\alpha,\alpha$-trifluoro-p-tolyl)-5-(chloromethyl)-1H-1,2,4-triazole-3-carboxylic acid:6-phenyl-8-(trifluoromethyl)-4H-s-triazolo[1,5-a][1,4] benzodiazepine-2-carboxylic acid; from 67.9 g (0.175 moles) of 1-(2-benzoyl-4-nitrophenyl)-5-(chloromethyl)-1H,1,2,4-triazole-3-carboxylic acid: 6-phenyl-8-nitro-4H-s-triazolo[1,5-a][1,4]benzodiazepine-2-carboxylic acid.

EXAMPLE 2

An amount of 0.408 g (0.001 mole) of 1-(2-benzoyl-4-chlorophenyl)-5-(chloromethyl)-1H-1,2,4-triazole-3-carboxylic acid (produced according to Example 1a and b, contains equimolar amount of methanol) and 0.320 g (0.003 mole) of hexamethylenetetramine are dissolved in 20 ml of ethanol; the solution is then refluxed for 12 hours. The solution is subsequently concentrated at 40° in vacuo, and the residue dissolved in 20 ml of 0.05-n sodium hydroxide solution; 2-N hydrochloric acid is added until an acid reaction is obtained on a congo-red indicator, and the precipitated crude product processed analogously to Example 1b. The obtained 6-phenyl-8-chloro-4H-s-triazolo[1,5-a][1,4]benzodiazepine-2-carboxylic acid melts at 170°, with decomposition; yield 0.264 g, 78% of theory.

EXAMPLE 3 a. An amount of 8.15 g (0.020 mole) of 1-(2-benzoyl-4-chlorophenyl)-5-(chloromethyl)-1H-1,2,4-triazole-3-carboxylic acid, produced according to Example 1a and b and containing an equimolar amount of methanol, is added at 30°, with stirring, to a solution of 3.25 g (0.05 mole) of sodium azide and 0.332 g (0.002 mole) of potassium iodide in 100 ml of dimethylsulphoxide; the obtained clear solution is then stirred for a further 3 hours at the same temperature. The reaction mixture is subsequently diluted with 500 ml of ice water, made acid with 50 ml of 2-N hydrochloric acid to a congo-red indicator, and the crude product extracted twice with 150 ml of methylene chloride each time. Each extract is washed twice with 300 ml of water each time, dried over sodium sulphate, and concentrated in vacuo at 40°. The residue is triturated with 50 ml of methanol, whereupon it crystallises. The obtained methanol suspension is concentrated by evaporation, and dried in vacuo at 70°-80°; the resulting crude 1-(2-benzoyl-4-chlorophenyl)-5-(azidomethyl)-1H-1,2,4-triazole-3-carboxylic acid melts at 157° with decomposition. The pure compound melts, after recrystallisation from ether/hexane, at 161° with decomposition; yield 7.0 g, 91.5% of theory.

b. An amount of 3.83 g (0.010 mole) of the compound obtained according to a and 3.14 g (0.012 mole) of triphenylphosphine, dissolved in 50 ml of abs. tetrahydrofuran, is refluxed for 1 hour. The solvent is then evaporated off in vacuo at 40°; an amount of 150 ml of 0.1-N sodium hydroxide solution is added to the crude residue, the undissolved neutral constituents are removed by filtration, and the clear filtrate made acid to a congo-red indicator by the addition of 10 ml of 2-N hydrochloric acid. The acidified suspension is allowed to stand for 16 hours at 5°; the crude product is then filtered off under suction, washed until neutral with water, and recrystallised from ethanol. The obtained crystals are dried at 100°-120°, whereupon the resulting 6-phenyl-8-chloro-4H-s-triazolo [1,5-a][1,4]benzodiazepine-2-carboxylic acid melts at 170° with decomposition; yield 2.6 g, 77% of theory.

EXAMPLE 4

A solution of 8.0 g (0.20 mole) of sodium hydroxide in 400 ml of water is added dropwise, within 2 hours, to a solution of 51.2 g (0.10 mole) of [2-(o-fluorobenzoyl)-4-chloro-phenylazo]-(2-chloroacetamido)-malonic acid diethyl ester [produced according to Example 1a)] in 600 ml of dioxane. The temperature of the reaction mixture rises from 20° initially to a maximum of 30°, and the pH-value finally attains a value of 8.5 to 9.0. After 45 minutes the mixture is stirred at room temperature; it is thereupon neutralised by the addition of glacial acetic acid, and concentrated in vacuo. Ice and 5% sodium bicarbonate solution are added to the residue; the mixture is then extracted twice with ether, and the aqueous phase retained. The organic phases are combined, washed with ice-cold 5% sodium bicarbonate solution and water, dried over sodium sulphate, and concentrated in vacuo. The residue is recrystallised from isopropanol. After drying, the obtained 1-[2-(o-fluorobenzoyl)-4-chlorophenyl]-5-(chloromethyl)-1H-1,2,4-triazole-3-carboxylic acid ethyl ester melts at 97°-98°; yield 19.2 g, 45.5% of theory.

The above aqueous sodium bicarbonate solutions (the original ones and the washing solutions) are combined; 10% hydrochloric acid is then added until an acid reaction to a congo-red indicator is obtained, and the whole extracted 3 times with methylene chloride. The combined organic extracts are washed with water and with saturated sodium chloride solution, dried over sodium sulphate, and concentrated in vacuo. Crude amorphous 1-[2-(o-fluorobenzoyl)-4-chlorophenyl]-5-(chloromethyl)-1H-1,2,4-triazole-3-carboxylic acid is thus obtained; yield 15.3 g, 38.6% of theory. This crude acid can be used direct for cyclisation analogously to Example 1c.

b. An amount of 400 ml of acetone is poured over 19.2 g (0.046 mole) of 1-[2-(o-fluorobenzoyl)-4-chlorophenyl]-5-(chloromethyl)-1H-1,2,4-triazole-3-carboxylic acid ethyl ester and 10.2 g (0.068 mole) of sodium iodide. The mixture is refluxed for 40 minutes, and afterwards concentrated in vacuo to dryness. The residue is dissolved in 100 ml of water and 200 ml of methylene chloride; the organic phase is separated, washed with saturated sodium chloride solution, dried over sodium sulphate, and concentrated at 30° in vacuo. The residue is recrystallised from ether/hexane. After drying, the obtained 1-[2-(o-fluorobenzoyl)-4-chlorophenyl]-5-(iodomethyl)-1H-1,2,4-triazole-3-carboxylic acid ethyl ester melts at 100°-102°; yield 18.5 g, 79% of theory.

c. A solution of 1.6 g (0.0031 mole) of 1-[2-(o-fluorobenzoyl)-4-chlorophenyl]-5-(iodomethyl)-1H-1,2,4-triazole-3-carboxylic acid ethyl ester in 30 ml of dimethylsulphoxide is added dropwise at 30°, within 5 minutes, to a solution of 0.5 g (0.0078 mole) of sodium azide in 70 ml of dimethylsulphoxide; the mixture is subsequently heated, with stirring, for 4 hours at 40°. An amount of 200 ml of ice water is added to the reaction solution, and this extracted twice with 100 ml of methylene chloride. The organic phase is washed 3 times with water, dried over sodium sulphate, and concentrated in vacuo. This residue is recrystallised from isopropanol. After drying, the obtained 1-[2-(o-fluorobenzoyl)-4-chlorophenyl]-5-(azidomethyl)-1H-1,2,4-triazole-3-carboxylic acid ethyl ester melts at 114°-116°; yield 1.1 g, 83% of theory.

d. The solution of 1.0 g (0.0023 mole) of 1-[2-(o-fluorobenzoyl)-4-chlorophenyl]-5-(azidomethyl)-1H-1,2,4-triazole-3-carboxylic acid ethyl ester and 0.76 g (0.0029 mole) of triphenylphosphine in 100 ml of tetrahydrofuran is stirred for 3 hours at 25°. The reaction mixture is concentrated in vacuo to dryness, and the residue dissolved in ether and water. The organic phase is separated, washed with water and with saturated sodium chloride solution, dried over sodium sulphate, and concentrated in vacuo to dryness. The residue is recrystallised from isopropanol. After drying, the obtained 6-(o-fluorophenyl)-8-chloro-4H-s-triazolo[1,5-a][1,4] benzodiazepine-2-carboxylic acid ethyl ester melts at 177°-179°; yield 0.70 g, 79% of theory.

EXAMPLE 5

A solution of 0.34 g (0.0013 mole) of tin(II)-chloride dihydrate in 3 ml of 2-N sodium hydroxide solution is slowly added dropwise at -5° to a solution of 0.43 g (0.001 mole) of 1-[2-(o-fluorobenzoyl)-4-chlorophenyl]-5-(azidomethyl)-1H-1,2,4-triazole-3-carboxylic acid ethyl ester [cp. Example 4a to c)] in 400 ml of 95% aqueous ethanol. The reaction mixture is stirred for 20 minutes at 0°, thereupon neutralised with glacial acetic acid and concentrated in vacuo to dryness. After addition of ice water, the residue is extracted twice with methylene chloride. The organic phase is washed once with ice-cold 1-N. sodium bicarbonate solution and twice with water. Then it is dried over sodium sulfate and concentrated in vacuo to dryness. The residue is recrystallised from isopropanol. After drying, the obtained 6-(o-fluorophenyl)-8-chloro-4H-s-triazolo[1,5-a] [1,4]benzodiazepine-2-carboxylic acid ethyl ester melts at 177°–179°; yield 0.25 g, 65% of theory.

EXAMPLE 6 a. A solution of 0.84 g (0.002 mole) of 1-[2-(o-fluorobenzoyl)-4-chlorophenyl]-5-(chloromethyl)-1H-1,2,4-triazole-3-carboxylic acid ethyl ester [cp. Example 4a] and 0.56 g (0.003 mole) of phthalimide potassium in 40 ml of dimethylformamide is stirred for 1 hour at 40°. The reaction mixture is then poured on ice water and extraction performed twice with ethyl acetate. The organic phase is washed 3 times with water, dried over potassium sulphate, and concentrated in vacuo to dryness. The residue is recrystallised from ether. After drying, the obtained 1-[2-(o-fluorobenzoyl)-4-chlorophenyl]-5-(phthalimidomethyl)-1H-1,2,4-triazole-3-carboxylic acid ethyl ester melts at 146°–148°; yield 0.8 g, 75.5% of theory.

b. An amount of 0.10 g (0.002 mole) of hydrazine hydrate is added to a solution of 0.53 g (0.001 mole) of 1-[2-(o-fluorobenzoyl)-4-chlorophenyl]-5-(phthalimidomethyl)-1H-1,2,4-triazole-3-carboxylic acid ethyl ester in 50 ml of ethanol and 20 ml of chloroform; the reaction mixture is then stirred for 20 hours at room temperature. It is afterwards concentrated by evaporation to dryness, and the residue repeatedly extracted with methylene chloride, the desired reaction product dissolving during this process and the phthalhydrazide formed during the reaction remaining undissolved. The combined methylene chloride extracts are filtered through purified diatomaceous earth; the filtrate is concentrated in vacuo to dryness, and the residue recrystallised from isopropanol. After drying, the obtained 6-(o-fluorophenyl)-8-chloro-4H-s-triazolo[1,5-a][1,4]benzodiazepine-2-carboxylic acid ethyl ester melts at 177°–179°; yield 0.30 g, 78% of theory.

EXAMPLE 7 a. A solution of 8.0 g (0.043 mole) of phthalimide potassium and 7.5 g (0.03 mole) of (2-chloroacetamido)-malonic acid diethyl ester [cp. Ajay Kumar Bose, J. Indian Chem.Soc. 31, 108–110 (1954)] in 120 ml of dimethylformamide is heated, with stirring, for 2 hours at 70°. The reaction mixture is poured on 400 ml of ice water, and extraction performed twice with methylene chloride. The organic extracts are washed with water and saturated sodium chloride solution, dried over sodium sulphate, and concentrated in vacuo to dryness. The residue is recrystallised from ethanol. After drying, the obtained (2-phthalimidoacetamido)-malonic acid diethyl ester [(1,-3-dioxoisoindoline-2-acetamido)-malonic acid diethyl ester] melts at 193°–195°; yield 6.8 g, 63% of theory.

b. A solution of 2.50 g (0.01 mole) of 2-amino-5-chloro-2'-fluorobenzophenone in 20 ml of the mixture of glacial acetic acid and conc. hydrochloric acid (4:1) is diazotised at room temperature, with stirring, with 2.06 ml (0.01 mole) of 5-N aqueous sodium nitrite solution. Additions are made to the obtained diazonium salt solution of 5 g of ice and then, dropwise, of a solution of 2.9 g (0.008 mole) of (2-phthalimidoacetamido)-malonic acid diethyl ester in 80 ml of acetone. After half the coupling component has been added dropwise, a start is made with the simultaneous addition dropwise of a solution of 8.0 g (0.058 mole) of potassium carbonate in 15 ml of water. During the dropwise addition, the temperature of the orange-red reaction mixture reaches 20°. After the addition is completed, stirring is continued for 30 minutes at room temperature, and an addition then made of 50 ml of ether and 200 g of ice cold water. The ether phase is separated, washed with cold 0.1-N sodium bicarbonate solution and water, dried over sodium sulphate, and concentrated in vacuo to dryness. The residue crystallises on trituration with ether. The obtained crystals are separated, and recrystallised from methylene chloride/isopropanol. After drying, the obtained [2-(o-fluorobenzoyl)-4-chlorophenylazo]-(2-phthalimidoacetamido)-malonic acid diethyl ester [[2-(o-fluorobenzoyl)-4-chlorophenylazo]-(1,3-dioxoisoindoline-2-acetamido)-malonic acid diethyl ester] melts at 137°–139°; yield 2.8 g, 55% of theory.

c. A solution of 0.88 g (0.002 mole) of sodium hydroxide in 4 ml of water is added dropwise at 10° to a solution of 0.64 g (0.001 mole) of [2-(o-fluorobenzoyl)-4-chlorophenylazo]-(2-phthalimidoacetamido)-malonic acid diethyl ester in 10 ml of dioxane. Stirring is continued for 30 minutes at room temperature; the reaction mixture is neutralised with glacial acetic acid, and then concentrated in vacuo. Ice water is added to the residue, and extraction performed with ethyl acetate. The organic phases are washed with ice cold 0.1-N sodium bicarbonate solution and water, dried over sodium sulphate, and concentrated in vacuo. The residue is triturated with ether until crystallisation occurs. The precipitated crystals are recrystallised from ether. After drying, the obtained 1-[2-(o-fluorobenzoyl)-4-chlorophenyl]-5-(phthalimidomethyl)-1H-1,2,4-triazole-3-carboxylic acid ethyl ester melts at 146°–148°; yield 0.32 g, 60% of theory.

d. The reaction product of c is stirred, analogously to Example 6b, with 0.06 g of hydrazine hydrate in 30 ml of ethanol and 12 ml of chloroform for 20 hours at room temperature. After processing according to Example 6b, 6-(o-fluorophenyl)-8-chloro-4H-s-trizaolo[1,5-a] [1,4] benzodiazepine-2-carboxylic acid ethyl ester, M.P. 177°–179°, is obtained.

EXAMPLE 8

An amount of 1.0 ml (0.014 mole) of conc. ammonia is added dropwise, at room temperature, to a solution of 2.56 g (0.005 mole) of (2-chloroacetamido)-[2-(o- fluorobenzoyl)-4-chlorophenylazo]-malonic acid diethyl ester [produced analogously to Example 1a] in 10 ml of dimethylformamide. The mixture is stirred for 20 hours at room temperature; it is then poured on 100 ml of ice water, and extracted twice with ether. The organic extracts are washed with water and saturated sodium chloride solution, dried over sodium sulphate, and concentrated in vacuo to dryness. The residue is dissolved in benzene/ethyl acetate (1:1), and the solution chromatographed on 200 g of silica gel. Benzene/ethyl acetate (1:1) is employed as the eluant. The fractions containing the crude product [$R_f$-value: 3.7 in the system benzene/ethyl acetate (1:1)] are combined, and recrystallised from isopropanol. After drying, the obtained 6-(o-fluorophenyl)-8-chloro-4H-s-triazolo[1,5-a][1,4]benzodiazepine-2-carboxylic acid ethyl ester melts at 177°–179°; yield 0.8 g, 43% of theory.

EXAMPLE 9

An amount of 0.962 g (0.0025 mole) of 6-(o-fluorophenyl)-8-chloro-4H-s-triazolo[1,5-a][1,4]benzodiazepine-2-carboxylic acid ethyl ester is refluxed in 50 ml of methanol and 5.1 ml (0.0051 mole) of 1-N sodium hydroxide solution for 32 hours. The reaction solution is subsequently concentrated by evaporation; the residue is dissolved in 10 ml of water, and 2-N hydrochloric acid added to the solution until an acid reaction to a congo-red indicator is shown. The precipitated carboxylic acid is filtered by suction, and washed with water until neutral. It is afterwards washed a further 3 times with 10 ml of methanol each time, and dried in vacuo at 100°. The obtained 6-(o-fluorophenyl)-8-chloro-4H-s-triazolo[1,5-a][1,4]benzodiazepine-2-carboxylic acid decomposes at 179°–182°; yield 0.817 g, 88% of theory.

EXAMPLE 10

A solution of 4.22 g (0.01 mole) of 1-[2-(o-fluorobenzoyl)-4-chlorophenyl]-5-(chloromethyl)-1H-1,2,4-triazole-3-carboxylic acid ethyl ester [cp. Example 4a] and 2.8 g (0.02 mole) of hexamethylenetetramine in 70 ml of abs. ethanol is refluxed for 6 hours. The solution is then concentrated at 40° in vacuo; an amount of 200 ml of ice water is added to the residue, and extraction performed twice with methylene chloride. The organic phase is washed twice with ice-cold 1-N hydrochloric acid, and 3 times with water, dried over sodium sulphate, and concentrated in vacuo. The residue is crystallised from isopropanol. After drying, the obtained 6-(o-fluorophenyl)-8-chloro-4H-s-triazolo[1,5-a][1,4]benzodiazepine-2-carboxylic acid ethyl ester melts at 177°–179°; yield 2.85 g, 74% of theory.

EXAMPLE 11

An amount of 10 ml (0.01 mole) of 1-N sodium hydroxide solution is added to a solution of 3.39 g (0.01 mole) of 6-phenyl-8-chloro-4H-s-triazolo[1,5-a][1,4]benzodiazepine-2-carboxylic acid in 300 ml of methanol, and the whole concentrated in vacuo at 40°. The residue crystallises on trituration with isopropanol. The crystals are filtered off under suction, washed well with isopropanol, and afterwards dried over calcium chloride in a vacuum-desiccator. The obtained sodium salt of 6-phenyl-8-chloro-4H-s-triazolo[1,5-a][1,4]benzodiazepine-2-carboxylic acid melts with carbonisation at 295°–300°; yield 2.5 g, 71% of theory.

EXAMPLE 12

A solution of 16.0 g (0.047 moles) of 6-phenyl-8-chloro-4H-s-triazolo[1,5-a][1,4]benzodiazepine-2-carboxylic acid in 320 ml of diethylene glycol is heated under nitrogen to 120°, and 200 mg of copper(I)-oxide are added, whereupon the starting product decomposes with the evolution of carbon dioxide. The reaction mixture is heated for 14 hours at 120°–125°; it is subsequently cooled, diluted with 3 litres of ice water, and extracted 3 times with 1 litre of ether each time. The ether extract is washed with water, dried over sodium sulphate, and concentrated in vacuo. The residue (12.0 g) is dissolved in benzene/ethyl acetate, and the solution chromatographed on a column of 1000 g of silica gel. Benzene/ethyl acetate (3:2) is used as the eluant. The fractions in which the desired product ($R_f$ 0.37) is dissolved are concentrated by evaporation, and the residue recrystallised from isopropanol, whereupon pure 6-phenyl-8-chloro-4H-s-triazolo[1,5-a](1,4)benzodiazepine, M.P. 126°–128°, is obtained.

The following are obtained in an analogous manner: from 18.6 g (0.05 moles) of 6-(o-chlorophenyl)-8-chloro-4H-s-triazolo[1,5-a][1,4]benzodiazepine-2-carboxylic acid: 6-(o-chlorophenyl)-8-chloro-4H-s-triazolo[1,5-a][1,4] benzodiazepine, M.P. 175°–177° (from isopropanol).

What we claim is:

1. A compound of the formula I,

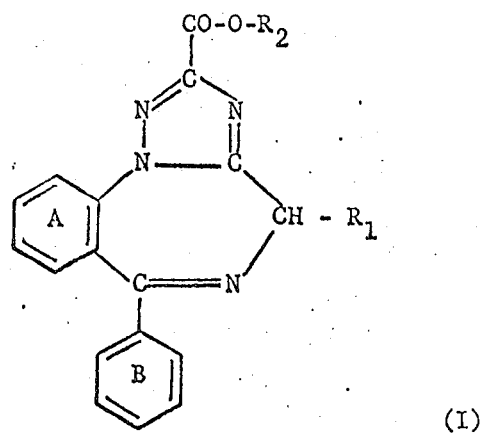

(I)

wherein
$R_1$ represents hydrogen or a lower alkyl group,
$R_2$ represents hydrogen or a lower alkyl group and
wherein each of the rings A and B, independently of the other, is unsubstituted or mono-substituted by fluorine, chlorine and/or bromine atoms, alkyl or alkoxy groups each having 1 to 6 carbon stoms, trifluoromethyl groups and/or nitro groups;
or a salt of a carboxylic acid embraced by the formula I with an inorganic or organic base.

2. A compound according to claim 1 having the formula I, wherein $R_1$ and $R_2$ have the meanings given in claim 1 and wherein each of the rings A and B, independently of the other, is unsubstituted or substituted by a single fluorine, chlorine or bromine atom, nitro group or trifluoromethyl group, or a salt of a carboxylic acid embraced by the formula I as defined hereinbefore with an inorganic or organic base.

3. A compound according to claim 1 having the formula I, wherein $R_1$ and $R_2$ have the meanings given in claim 1 and wherein each of the rings A and B, independently of the other, is unsubstituted or substituted by a single fluorine, chlorine or bromine atom, nitro group or trifluoromethyl group.

4. A compound according to claim 1 having the formula I, wherein R₁ and R₂ represent hydrogen atoms and wherein each of the rings A and B, independently of the other, is unsubstituted or substituted by a single fluorine, chlorine or bromine atom, nitro group or trifluoromethyl group.

5. A compound according to claim 1 having the formula I wherein R₁ represents a hydrogen atom, R₂ represents a lower alkyl group and wherein each of the rings A and B, independently of the other, is unsubstituted or substituted by a single fluorine, chlorine or bromine atom, nitro group or trifluoromethyl group.

6. A compound according to claim 1 having the formula I, wherein R₁ and R₂ represent hydrogen atoms and wherein the ring A is unsubstituted or substituted by a chlorine atom in the 8-position and ring B is unsubstituted or substituted by a fluorine or chlorine atom in the o-position.

7. A compound according to claim 1 having the formula I wherein R₁ represents a hydrogen atom, R₂ represents a lower alkyl group and wherein the ring A is unsubstituted or substituted by a chlorine atom in the 8-position and ring B is unsubstituted or substituted by a fluorine or chlorine atom in the o-position.

8. A compound according to claim 1 which is 6-phenyl-8-chloro-4H-s-triazolo[1,5-a][1,4]benzodiazepine-2-carboxylic acid.

9. A compound according to claim 1 which is 6-(o-chlorophenyl)-8-chloro-4H-s-triazolo[1,5-a][1,4]benzodiazepine-2-carboxylic acid.

10. A compound according to claim 1 which is 6-(o-fluorophenyl)-8-chloro-4H-s-triazolo[1,5-a][1,4]benzodiazepine-2-carboxylic acid.

11. A compound according to claim 1 which is 6-phenyl-8-chloro-4H-s-triazolo[1,5-a][1,4]benzodiazepine-2-carboxylic acid ethyl ester.

12. A compound according to claim 1 which is 6-(o-chlorophenyl)-8-chloro-4H-s-triazolo[1,5-a][1,4]benzodiazepine-2-carboxylic acid ethyl ester.

13. A compound according to claim 1 which is 6-(o-fluorophenyl)-8-chloro-4H-s-triazolo[1,5-a][1,4]benzodiazepine-2-carboxylic acid ethyl ester.

14. A process for the production of a compound of the formula I given in claim 1, wherein R₁ and R₂ have the meanings given in claim 1 and each of the rings A and B, independently of the other, is unsubstituted or substituted as defined in claim 1, which consists essentially in converting a o-amino-benzophenone of the formula II:

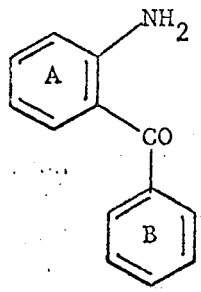

(II)

wherein each of the rings A and B, independently of the other, is unsubstituted or substituted as defined in claim 1, into the corresponding diazonium chloride; coupling of the diazonium chloride with a substituted malonic acid dialkyl ester of the formula III:

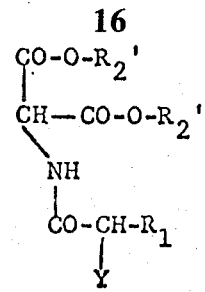

(III)

wherein
Y represents a chlorine atom or the phthalimido group, and
R₂' represents a lower alkyl group, and R₁ has the meaning given in claim 1,
to obtain a compound of the formula IV:

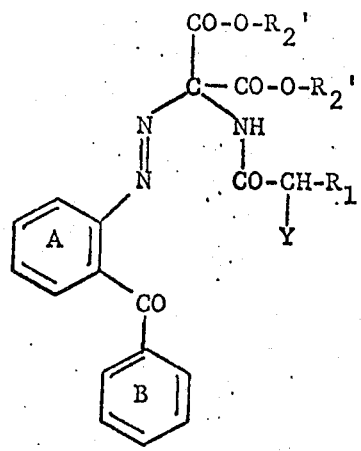

(IV)

wherein R₁, R₂' and Y have the meanings given under formula I and under formula III, and each of the rings A and B, independently of the other, is unsubstituted or substituted as defined in claim 1, reacting the compound of formula IV with an aqueous or aqueous-organic alkali hydroxide solution or with an aqueous-organic ammonia solution to obtain a compound of the formula V:

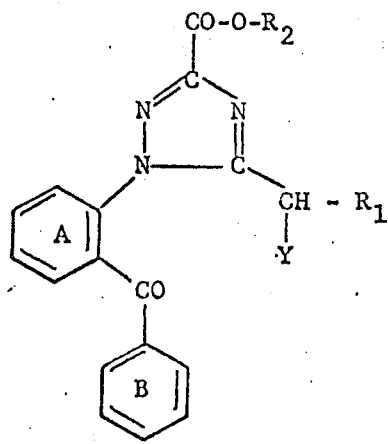

(V)

and reacting a compound of the formula V, wherein R₁ and R₂ have the meanings given in claim 1, and each of the rings A and B, independently of the other, is unsubstituted or substituted as defined in claim 1, and wherein Y represents a chlorine atom, with ammonia or hexamethylenetetramine.

15. Process according to claim 14, wherein the reaction of a compound of the formula IV given in claim 14, wherein $R_1$ represents hydrogen or a lower alkyl group, $R_2'$ represents a lower alkyl group and Y represents chlorine and wherein each of the rings A and B, independently of the other, is unsubstituted or substituted as defined in claim I, with an aqueous organic ammonia solution and the reaction of the corresponding compound of the formula V given in claim 14, which compound is formed thereby, with ammonia is carried out in the same working step.

16. A process as claimed in 14 wherein a compound of formula V is preliminarily treated with an alkali metal iodide.

17. A process as claimed in 14 wherein the step converting the compound of formula V into a compound of formula I is carried out by reacting said compound of formula V with an alkali metal azide and reducing the obtained azido compound with triphenylphosphine in an inert organic solvent or with tin(II)-chloride in a lower alkanolic-aqueous alkali hydroxide solution.

18. A process as claimed in claim 17 wherein a compound in formula V is preliminarily treated with an alkali metal iodide.

19. A process as claimed in claim 14 wherein the step of converting a compound of formula V into a compound of formula I is carried out by reacting said compound of formula V with an alkali metal compound of phthalimide and subjecting the compound of formula V obtained in this manner or obtained directly from the compound formula IV, wherein Y represents phthalimido group with the above mentioned reaction with an aqueous or aqueous-organic alkali hydroxide solution or with an aqueous-organic solution of ammonia, to a solvolysis with hydrazine or hydrazine hydrate.

* * * * *